May 23, 1950     A. R. VAN C. WARRINGTON     2,509,025
PROTECTIVE SYSTEM FOR FAULT
AND OUT-OF-STEP CONDITIONS
Filed Nov. 16, 1948
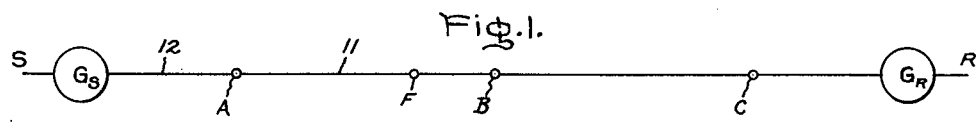
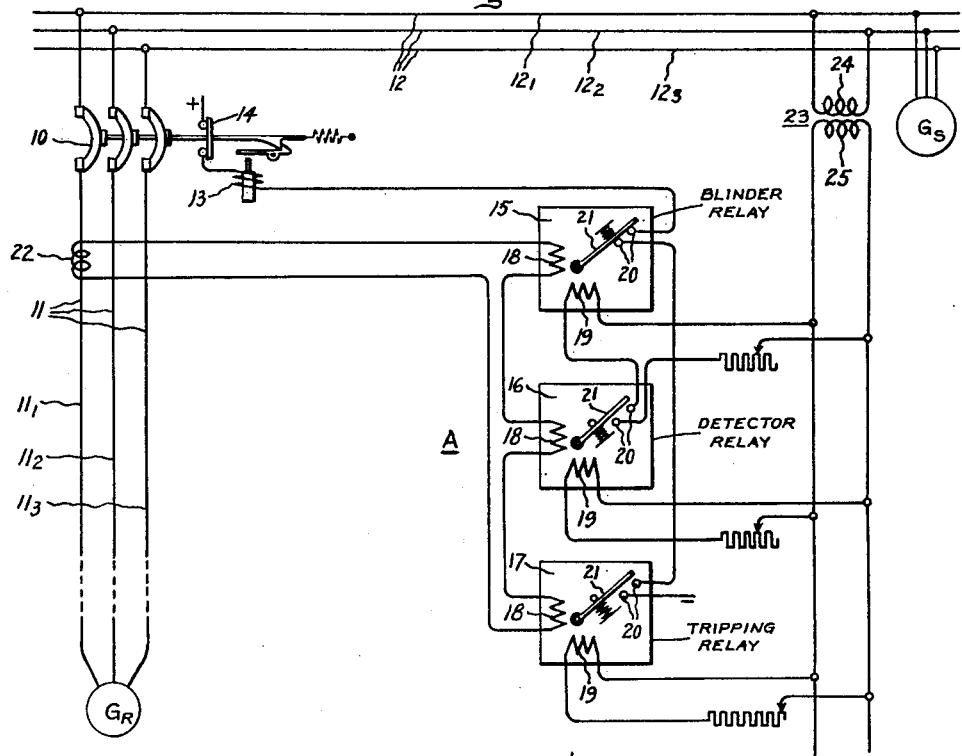
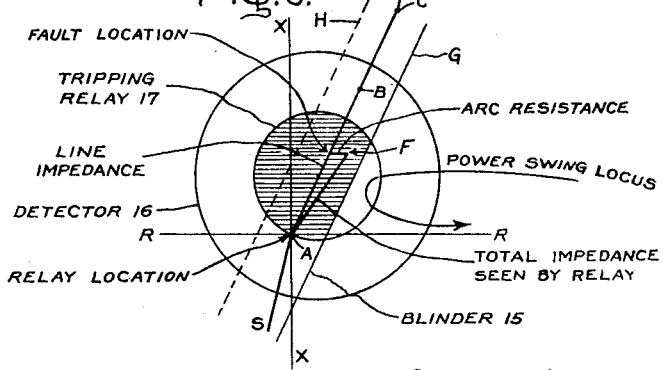
Inventor:
Albert R. van C. Warrington,
by Ernest C. Britton
His Attorney.

UNITED STATES PATENT OFFICE 2,509,025

PROTECTIVE SYSTEM FOR FAULT AND OUT-OF-STEP CONDITIONS

Albert R. van C. Warrington, Wallingford, Pa., assignor to General Electric Company, a corporation of New York Application November 16, 1948, Serial No. 60,345

2 Claims. (Cl. 175—294)

My invention relates to improvements in the supervision of alternating current electric systems and more particularly to a fault responsive protective system which also separates the system upon the occurrence of an out-of-step condition.

Faults as well as rapid changes in loading conditions on alternating current electric systems have been known to cause synchronous machinery to fall out of step and thereby to produce such unstable voltage and current conditions on sound portions of the system as to cause false operation of the fault responsive protective relays and circuit breakers controlled thereby on the sound portions. Obviously, such false operation must be avoided because loads are likely to be left without any source of power. In United States Letters Patent 2,095,117, Bancker et al., granted October 5, 1937, and assigned to the same assignee as the present application, there is disclosed and claimed a protective system which, on the occurrence of out-of-step conditions, subdivides the system in such a way as to eliminate the out-of-step condition while, at the same time, permitting an adequate source of power for every subdivision. This system is not suitable for use with relays operating in times less than three cycles because the operating time of the relay which distinguishes between faults and out-of-step conditions on the one hand and harmless conditions such as power swings on the other hand is likely to be long because, in order to prevent tripping on power swings from which the system is likely to recover, the characteristic of this relay is close to the fault impedance value, leaving very little surplus of operating torque over restraining torque so that the relay is likely to be slow in response especially with arcing faults. On the other hand, power swing conditions change relatively slowly so that high-speed relay operation is not required on their account but, when a fault or out-of-step condition occurs, the response of all the relays should be prompt so as to provide a tripping time comparable with that of modern high-speed breakers, i. e., about one cycle.

It would be desirable to have a protective system which not only would distinguish faults on the system from other conditions and instantly isolate the system on the occurrence of such faults, but would properly recognize an out-of-step condition and separate the system without delay at any predetermined point.

It is an object of my invention to provide a new and improved fault responsive and out-of-step protective scheme which operates the protective means earlier during the fault or out-of-step condition than was heretofore possible.

It is another object of my invention to provide a new and improved protective system for quickly terminating an out-of-step condition in order to avoid the troubles associated with instability.

It is another object of my invention to provide a protective arrangement which will give complete protection for both fault and out-of-step conditions on systems involving long transmission lines.

It is still another object of my invention to provide a protective arrangement wherein means are provided for distinguishing between power swings of moderate severity on the one hand and out-of-step and fault conditions on the other hand, and wherein prompt and precise clearing of fault and out-of-step conditions is achieved.

Further objects and advantages of my invention will become apparent as the following description proceeds, and the features of novelty which characterize my invention will be pointed out with particularity in the claims annexed to and forming a part of this specification.

In accordance with my invention, an electro-responsive device is utilized to operate a circuit interrupter in response to fault and out-of-step conditions, and suitable electroresponsive means operable during power swing conditions are utilized to prevent tripping during such conditions, but not during fault conditions. Because the means for preventing tripping during relatively slow power swing conditions does not operate to interfere with tripping during instantly developed fault conditions, the time required for such means to operate during fault conditions in prior arrangements is saved.

For a better understanding of my invention, reference may be had to the accompanying drawings, in which Fig. 1 is a single line diagram of an equivalent alternating current system showing the generation lumped as two equivalent generators $G_S$ at the sending or leading end S of the system and $G_R$ at the receiving or lagging end R, and the relay stations A, B and C; Fig. 2 is a schematic diagram of a polyphase alternating current system illustrating one embodiment of my invention in which the protective arrangement is shown for only one phase conductor; and Fig. 3 is an impedance diagram to aid in understanding my invention.

Referring now to Fig. 2, I have illustrated my invention as applied to the protection of a polyphase alternating current system in which the protective devices at a station such as A of Fig. 1 are shown. An electric circuit interrupting device 10 is connected between the line section 11 on one side of station A and the bus 12. A portion of the line section 11 has been indicated by dotted lines to indicate greater length of line than is shown. My invention is concerned with protecting the section 11 of the adjacent circuit breaker 10 which will hereinafter be referred to as the protected section. Both the bus 12 and the line section 11 have been illustrated as three-phase circuits comprising phase conductors $11_1$, $11_2$, $11_3$, $12_1$, $12_2$ and $12_3$, respectively. Circuit interrupting device 10 has been illustrated as a polyphase latched closed circuit breaker provided with a trip coil 13 and an "a" switch 14 which is closed when the circuit breaker is closed and open when the circuit breaker is open.

In Fig. 2, I have chosen, for the purpose of simplifying the drawings, to illustrate my invention with electroresponsive devices and associated apparatus for protecting one phase conductor of the protected section against certain faults occurring thereon. Actually, three such sets of electroresponsive devices would be required for complete distance protection against certain faults. It should be understood that polyphase electroresponsive devices might be employed instead of single phase devices, as shown.

Fig. 3 is an impedance diagram which is the vectorial equivalent of Fig. 1 and upon which are drawn the impedance characteristics of the relays at station A. The impedance of the line ABC is shown at its appropriate phase angle. The impedance SA of the generation behind the bus at A is, as would be expected, more lagging than the impedance of the line ABC; the impedance CR of the generation beyond the station is likewise shown more lagging. A fault is shown at F, as in Fig. 1, with some arc resistance. The locus of a power swing is shown at the right of Fig. 3 since the net power is outgoing from station A toward B and C.

As illustrated in Fig. 2, the protective system at station A comprises electroresponsive devices including three distance relays schematically shown and designated as 15, 16 and 17, respectively. These distance relays might be impedance relays or angle impedance or angle admittance relays, or combinations of the three. The term "impedance relay" implies a constant ohmic pickup at any phase angle between V and I, and the term "angle impedance" implies pickup at a constant component of impedance $$Z/\theta$$

Resistance and reactance relays are examples. The term "angle admittance" relay likewise means a relay which operates at a predetermined component of admittance $$Y/\theta$$

and in the trade the term "mho relay" is used for this type of relay.

In the typical case shown in Fig. 2, 15 is an angle impedance relay, 16 is an impedance relay, and 17 is an angle admittance or mho relay. As stated above, other combinations can be used; for instance, 16 can be a mho relay or even an overcurrent relay, while 17 can be a reactance distance relay and may be either a single zone relay as shown or may contain several units so as to provide a stepped or sloping time distance characteristic or a combination of these. However, since the specific structure of these electroresponsive devices forms no part of the present invention other than that they should measure some function of impedance of the protected line section 11, I have chosen to illustrate these relays 15, 16 and 17 schematically as each comprising a current winding 18 and a potential winding 19. Each of these relays is also provided with a pair of contacts 20 controlled by a movable contact controlling member 21.

The current windings 18 of relays 15, 16 and 17 may be connected in series with each other and energized from a suitable current transformer 22 associated with the phase conductor $11_1$ of line section 11 adjacent circuit breaker 10. The potential windings 19 of relays 15, 16 and 17 are energized with the potential obtained across phase conductors $12_1$ and $12_2$ through a suitable potential transformer 23 having a primary winding 24 and a secondary winding 25.

In U. S. Patent 2,405,079, assigned to the same assignee as this invention, two blinders similar to device 15 were shown, one adjusted to close its contacts for all apparent impedance values to the left of the line G in Fig. 3, and the other for all values to the right of line H so that the contacts of both blinders would close for impedances in the area between lines G and H. In the present invention, only the one blinder unit 15 is shown in Fig. 2, which has the characteristic G shown in Fig. 3, because only one blinder is necessary to illustrate my invention and because in practice more than one is very rarely required due to the fact that most lines are built to convey power preponderantly in one direction and hence power swings originate on one side of the diagram. The rare exception would be a line where power would flow in approximately the same amount in either direction. In this case, the net power is outgoing from A so the blinder is polarized to the right in the direction of the load impedance vector from which the power swing approaches.

In U. S. Patent 2,405,079, Warrington, assigned to the same assignee as this invention, a blinder relay having normally open contacts was used but a fault detector relay such as 16 in Fig. 2 was not used and slow tripping resulted on faults because the blinder unit was close to its pickup characteristic for an arcing fault such as is indicated by the mark F in Fig. 3. In the present invention, this slow tripping is avoided by using a blinder which does not have to operate during a fault, i. e., a blinder with normally closed contacts in series with the contacts of the tripping relay. In order to cause the blinder to open its contacts and thereby to prevent undesired tripping on account of power swings, means are provided for conditioning the blinder for operation upon the occurrence of power swings. Because power swings progress slowly, there is ample time for the blinder to open its contacts after the occurrence of the power swing and before the impedance characteristic of the tripping relay is invaded by the power swing. Should the power swing result in an out-of-step condition, the blinder operates to close its contacts as does the tripping relay and tripping of the interrupter occurs.

Thus, in accordance with this invention, the potential circuit of the blinder unit 15 is normally deenergized because the contacts of the fault detector 16 are normally open. Consequently there is no restraining force and the contacts 20 of the blinder 15 are normally closed.

Undesired tripping is avoided in the case of a power swing having an impedance characteristic such as is indicated in Fig. 3 because the apparent impedance of the system is to the right of G so that, when the power swing enters the characteristic of the fault detector 16, the contacts 20 of detector relay 16 will close and the potential coil 19 of blinder 15 will be energized and its contacts will open and remain open as long as the apparent impedance of the power swing is to the right of the line G. Thus, the trip coil 13 of interrupter 10 cannot be energized even if the power swing comes within the characteristic of tripping relay 17 so long as it remains to the right of the blinder characteristic G. Because the progress of the power swing is relatively slow, sufficient time is available for detector relay 16 to close its contacts and energize the potential coil of the blinder 15 to cause the blinder to open its contacts and block tripping after the power swing crosses the characteristic of detector relay 16 and before it crosses the characteristic of tripping relay 17. If the power swing becomes sufficiently severe to cross over to the left side of the line G, blinder 15 will close its contacts and tripping will result, but this is desirable because an out-of-step condition is eminent. Should the power swing impedance cross to the left of the blinder characteristic G for an instant and then immediately return to the right of the line G, the blinder may not operate. If it does not, no harm will have been done because the fact that the power swing returned to the right of line G means that the system did not fall out of step, although the chance of the system's pulling back into synchronism from such a swing might be small.

Prompt interruption during fault conditions is accomplished because the apparent system impedance moves instantly from a point outside the characteristic of detector 16 representative of normal load conditions to a point within the shaded area of Fig. 3. Thus, there is no time avaliable for the detector 16 to close its contacts and in turn to energize the potential coil of the blinder 15. But this is immaterial because, even if the blinder 15 had received potential, it would not have opened its contacts for a fault because the impedance presented by a fault is to the left of the blinder characteristic.

Should a power swing or other condition result in an out-of-step condition of the system, the apparent impedance will move from some point outside the impedance characteristic of detector relay 16 into and through the shaded area of Fig. 3. Because the development of an out-of-step condition is relatively slow, being a matter of seconds usually, there is ample time for the blinder 15 to open in response to operation of detector 16 and then close its contacts when the apparent impedance moves to the left of the blinder characteristic G. Thus, tripping in response to an out-of-step condition is sufficiently fast in view of the inherently slow progress of the system toward an out-of-step condition.

It will be understood that, while I have illustrated and described certain particular embodiments of my invention, modifications thereof will occur to those skilled in the art. I desire it to be understood, therefore, that my invention is not limited to the particular arrangements disclosed, and I intend in the appended claims to cover all modifications and changes which fall within the true spirit and scope of my invention.

What I claim as new and desire to secure by Letters Patent of the United States is:

1. A protective arrangement for preventing separation of an alternating current system when a relatively stable swing condition occurs and for effecting a prompt control operation when a fault or out-of-step condition occurs comprising a tripping relay having a substantially circular impedance characteristic and a pair of normally open contacts, a detecting relay having a pair of normally open contacts and a substantially circular impedance characteristic larger than the characteristic of said tripping relay and substantially concentric with respect thereto, and a blinder relay having a pair of normally closed contacts in series with the contacts of said tripping relay and a substantially linear impedance characteristic which intersects the characteristics of said tripping relay and said detector relay and which defines on one side thereof a range of stable swing conditions, said blinder relay having two windings one of which is constantly energized from the system and the other of which is energized from the system upon operation of said detecting device to cause operation of said blinder device to one position when the system impedance is indicative of a stable swing condition thereby to prevent undesired separation of the system by said tripping device, said blinder being operable to another position when the system impedance is indicative of an unstable swing condition thereby to render said tripping device effective to cause separation of the system.

2. A protective arrangement for preventing separation of an alternating current system when a relatively stable swing condition occurs and for effecting a prompt control operation when a fault or out-of-step condition occurs comprising a tripping relay and a detector relay energized from the system, a blinder relay operably energized from the system upon operation of said detector relay, said tripping and said detector relays being rendered operable substantially simultaneously in response to predetermined fault conditions so that said blinder is ineffective to prevent tripping by said tripping relay during such fault conditions and said detector relay being rendered operable before said tripping relay in response to predetermined power swing conditions, said blinder relay having control contacts which are operable to one position to prevent said tripping relay from performing a control operation in respsonse to said predetermined power swing conditions causing operation of said detector relay before operation of said tripping relay, the contacts of said blinder being operable to another position in response to power swing conditions more severe than said predetermined power swing conditions thereby to render said tripping relay effective to perform a control operation should the system lose synchronism.

ALBERT R. van C. WARRINGTON.

REFERENCES CITED

The following references are of record in the file of this patent:

UNITED STATES PATENTS

| Number | Name | Date |
|---|---|---|
| 2,386,209 | Goldsborough | Oct. 9, 1945 |
| 2,405,079 | Warrington | July 30, 1946 |
| 2,405,082 | Warrington | July 30, 1946 |

FOREIGN PATENTS

| Number | Country | Date |
|---|---|---|
| 527,343 | Great Britain | Oct. 7, 1940 |